Aug. 23, 1966  R. V. GERNER  3,268,240
PLASTIC-LINED CONDUIT
Filed Oct. 14, 1963  2 Sheets-Sheet 1

INVENTOR.
R. V. GERNER
BY Young and Quigg
ATTORNEYS

Aug. 23, 1966  R. V. GERNER  3,268,240
PLASTIC-LINED CONDUIT
Filed Oct. 14, 1963  2 Sheets-Sheet 2

INVENTOR.
R. V. GERNER
BY Young and Quigg
ATTORNEYS

United States Patent Office 3,268,240
Patented August 23, 1966

3,268,240
PLASTIC-LINED CONDUIT
Robert V. Gerner, Bartlesville, Okla., assignor to Phillips Petroleum Company, a corporation of Delaware
Filed Oct. 14, 1963, Ser. No. 316,016
1 Claim. (Cl. 285—55)

This invention relates to plastic-lined conduits. In one aspect the invention relates to terminating a plastic liner in a conduit. In another aspect the invention relates to sealing the annulus between a conduit at the terminal end of the liner. In still another aspect the invention relates to anchoring the terminal end of a plastic liner in a conduit.

It is known to employ plastic and other corrosion-resistant materials as liners in pressure-resistant conduits. One major problem encountered in lining a pressure-resistant conduit is that of terminating the liner in the conduit so as to anchor the liner and seal the annulus between the conduit. Means which have been proposed have been generally unsatisfactory because of being limited to low-pressure operation, being excessively bulky, or being too complex for use in field operations.

Figure 1:
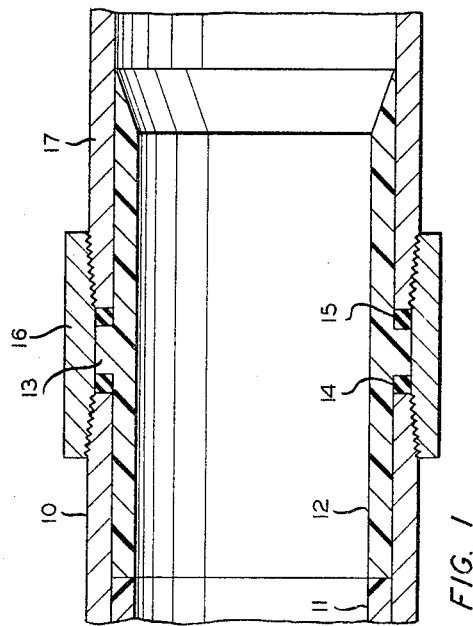
Figure 3:
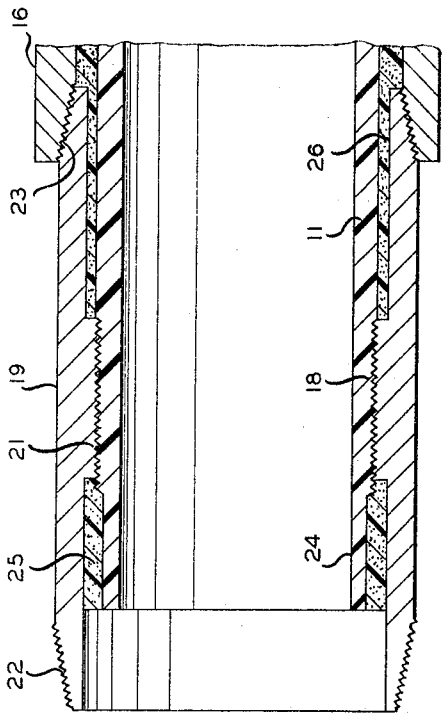
Figure 4:
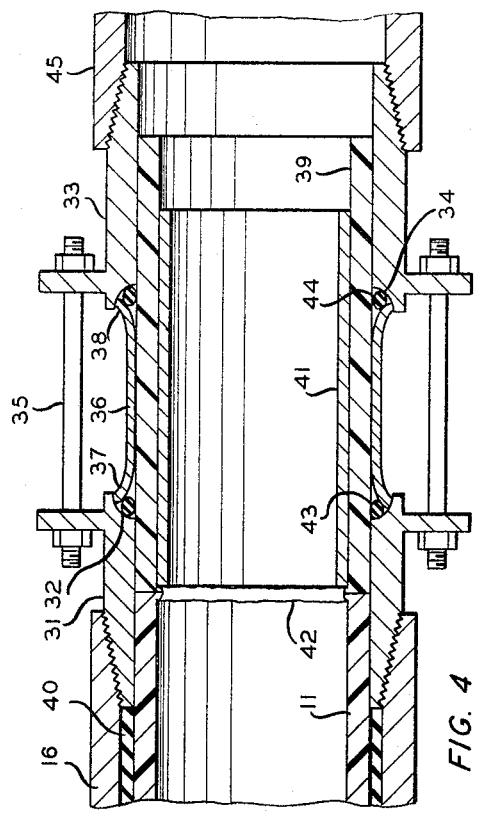
Figure 5:
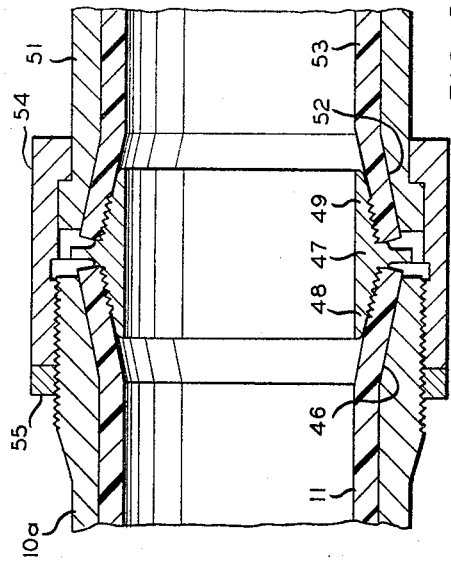
Figure 6:
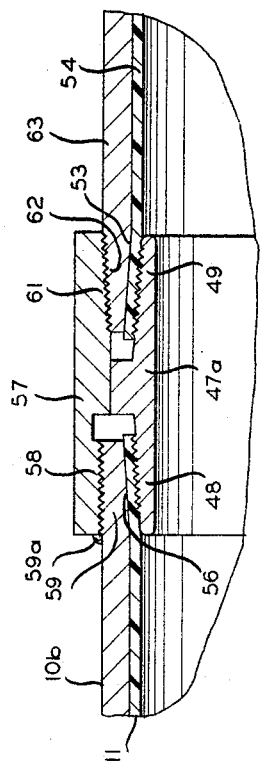
Figure 7:
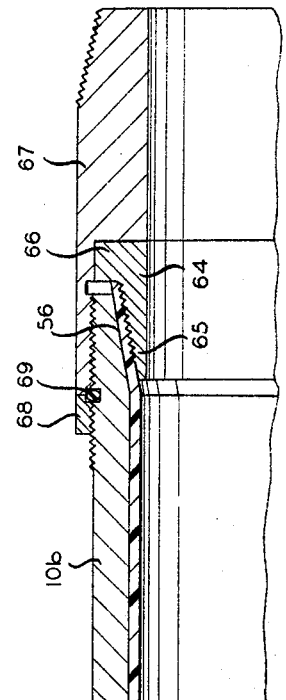
Figure 8:
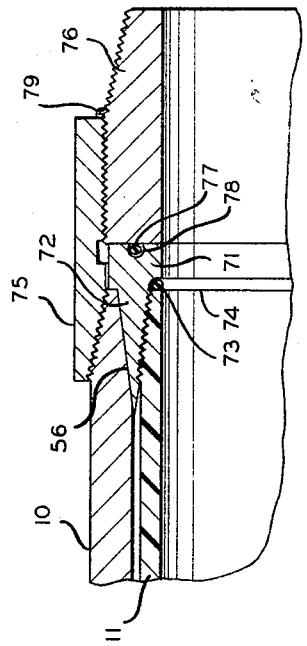
Figure 2:
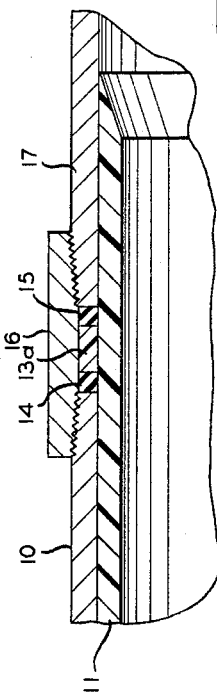

It is an object of the present invention to provide means to terminate a plastic liner in a conduit which is simple, economical and reliable. It is also an object to provide means to seal the end of a plastic liner to the conduit enclosing the liner. Another object is to provide means to anchor the terminal end of a plastic liner in a threadedly coupled conduit so as to seal the annulus between the liner and conduit. A further object of the invention is to provide means to seal the terminal end of a plastic liner in a conduit so that the outside dimensions of the conduit are not affected. Other objects and advantages of the invention will be apparent to those skilled in the art upon study of the disclosure including the detailed description of the invention and the attached drawing wherein:

FIGURE 1 is a sectional elevation of one embodiment of the terminal seal of the invention;
FIGURE 2 illustrates a modification of the embodiment of FIGURE 1;
FIGURE 3 illustrates another embodiment of the terminal seal of the invention;
FIGURE 4 illustrates another embodiment of the terminal seal of the invention;
FIGURE 5 illustrates another embodiment of the terminal seal of the invention wherein straight thread pipe is used;
FIGURE 6 illustrates a modification of the seal of FIGURE 5 wherein tapered thread pipe is used;
FIGURE 7 illustrates a modification of the seal of FIGURE 5 wherein the plastic liner ends at the seal and straight thread pipe is used; and
FIGURE 8 illustrates a modification of the seal of FIGURE 7 wherein tapered thread pipe is used.

Referring now to FIGURE 1, the terminal end of a plastic-lined conduit 10 is shown. The plastic liner 11 has a stub 12 with a shoulder 13 secured to its end so as to project past the end of conduit 10. Gaskets 14 and 15 are positioned around the stub 12 on either side of shoulder 13. A collar 16 compresses the gaskets 14 and 15 against the shoulder 13 and against the end of conduit 10 and the end of a stub 17 of corrosion-resistant material. The stub 17 can then be secured to any fitting or element that is desired. The end of conduit 10 and the end of stub 17 are squared or faced off to provide a good sealing surface.

The stub 12 is secured to the liner 11 by any desirable means, for example, welding, and this is accomplished by terminating the liner 11 several inches beyond the end of conduit 10 and after the weld is completed the stub 12 and the liner 11 can be pushed back into the conduit. The gaskets 14 and 15 are usually placed on the stub before it is welded to the liner 11 and these gaskets can be any suitable resilient material such as neoprene and can be flat ring gaskets or O-ring gaskets as desired. Additional gaskets can be used to provide additional thickness if needed. The collar 16 pulls the ends of the conduit 10 and the stub 17 against the gaskets effecting a seal between the plastic liner 11 and the conduit 10.

A modification of the seal of FIGURE 1 is shown in FIGURE 2 wherein the shoulder 13a is not an integral part of the liner or liner stub but can be a plastic ring adapted to fit snugly around the end of the liner 11. The modification shown in FIGURE 2 is simpler and more easily applied than that of FIGURE 1 because no welding operation is required and no stretching or compaction of the plastic liner is necessary. The modification of FIGURE 2 is satisfactory for use in applications where moderate pressures and temperatures are contemplated. The modification of FIGURE 1 is more rugged and provides a better seal than that of FIGURE 2. The modification of FIGURE 1 will provide a leakproof seal between the liner and the conduit under all conditions of pressure within the capabilities of the conduit and throughout the temperature range tolerated by the plastic liner.

In FIGURE 3 the plastic liner 11 is threaded at 18 so as to be threadably engaged with a stub member 19 having inside threads 21 to match the threads 18 on the plastic liner and having outside threads at 22 and 23 for connecting the stub 19 to the conduit 10 (not shown) by collar 16. The annulus between the tapered end of the liner 24 and the stub member 19 is filled with a sealing compound such as epoxy cement, as indicated at 25. Similarly, a sealing compound such as epoxy cement is used to fill the space between the stub member 19 and the plastic liner, as indicated at 26. When this connection is at the top of the string of tubing in the well, a union is used instead of collar 16. Any suitable well head fitting such as a T may be threaded onto threads 22.

In FIGURE 4 collar 16 on conduit 10 (conduit 10 not shown) has threaded therein a flange member 31 having a beveled face 32. A matching flange 33 having a beveled face 34 is secured to flange 31 by a plurality of bolts 35. A sleeve member 36 with outwardly flared ends 37 and 38 is positioned between flange members 31 and 33.

Platic liner 11 has welded to its end a plastic stub 39. A metal or other pressure-resistant sleeve member 41 is positioned within the stub member 39 by being pressed against the ridge 42, which represents the flash resulting from welding the stub 39 to the liner 11. Resilient gaskets 43 and 44 are positioned in the open faces of the flange members 31 and 33 so as to be compressed between the open faces 32 and 34 and the outwardly flared ends 37 and 38 of the sleeve 36 as the flange members 31 and 33 are drawn toward each other by means of the bolts 35. A fitting or other terminal connection indicated at 45 can be threaded onto flange 33. Rubber "recess filler" 40 occupies the space between liner 11 and collar 16.

In FIGURE 5 a conduit 10a, which can be a section of externally upset ended tubing, has an internal bevel 46 at its end. A ring member 47 having tapered, serrated end portions 48 and 49 is placed within the tubing 10a so as to compress the plastic liner 11 between the bevel 46 of the conduit 10a and the serrated end 48 of the ring 47. A fitting member illustrated as a half union 51 having an inside bevel 52 at a shouldered end is threaded onto conduit 10a. A plastic liner stub 53 is positioned in the half union member 51 so that an end of the liner stub 53 is compressed between the bevel 52 of the union member 51 and the serrated, tapered end 49 of the ring 47 as the union nut 54 is threaded onto the conduit 10a. A locking ring 55 secures the union nut 54 in place. The serrations can be rounded, shallow threads; the ring member 47 is then threaded into the end of liner 11 and then into liner 53, after which the union members are engaged and tightened.

In FIGURE 6 a conduit 10b is beveled on the inside of the end as indicated at 56 and is lined with plastic liner 11. A ring member 47a, as in FIGURE 5, is positioned in the end of lined conduit 10b so as to compress plastic liner 11 between the tapered end 48 of the ring 47a and the bevel 56 of conduit 10. A collar member 57 has straight inside threads 58 to match straight outside threads 59 on the end of conduit 10b. The collar member 57 has tapered threads 61 on its other end to fit tapered threads 62 of a fitting member 63. The fitting member 63 is beveled on its inside end as at 53. A plastic liner stub 54 is positioned in the beveled end of the fitting member 63 so as to be compressed between the bevel 53 and the tapered end 49 of the ring 47a. The tapered threads are tightened first with the fitting 63, liner 54, collar 57 and ring 47a in position as shown. Liner 11 is then threaded or forced over ring 47a and conduit 10b is then threaded into collar 57.

The modification shown in FIGURE 7 is applicable for use wherein it is not desirable to have a plastic liner stub extending past the terminal seal of the plastic liner. Conduit 10b, as in FIGURE 6, has bevel 56 on its inside. Ring member 64 has a tapered, serrated or threaded end 65 and a squared end 66. Ring member 64 is positioned in the end of plastic-lined conduit 10b so as to compress plastic liner 11 between the bevel 56 of the conduit 10b and the tapered end 65 of ring 64. A fitting member 67 is threaded onto conduit 10b so as to force the ring member 64 into the beveled end of the conduit 10b and secure the end of the plastic liner 11 against the beveled end of conduit 10b, in sealing relationship. A locking ring 68 secures the fitting 67 in position. A resilient O-ring gasket 69 can be employed between the locking ring 68 and the fitting member 67 if desired. The meeting faces of locking ring 68 and fitting member 67 are grooved to accommodate O-ring 69. An O-ring can be employed between mating faces of 66 and 67 as between faces of 71 and 76 in FIGURE 8.

A still further modification of the invention is shown in FIGURE 8 wherein plastic-lined conduit 10 has a bevel 56 on the inside of its end like that on the inside end of conduit 10b in FIGURE 7. A retainer ring 71 has a tapered lip 72 smoothed on its top side to match the bevel 56 and serrated or threaded on the inside so that the end of the plastic liner 11 is secured as it is threaded or forced into the lip 72 of ring member 71. An O-ring 73 is positioned in groove 74 in ring 71 to provide a seal between the ring 71 and the end of the plastic liner 11. Collar 75 has tapered threads in one side to match the tapered threads on the end of conduit 10 and has straight threads in the other side to match the straight threads on fitting or stub 76. An O-ring 77 is positioned in groove 78 in ring 71 to provide a seal between ring 71 and stub 76. Collar 75 is secured in position by a weld 79. A lock ring such as lock ring 68 of FIGURE 7 can be substituted for weld 79 if desired.

In the modifications of the invention shown in FIGURES 5, 6 and 7, one set of threads in the threaded connection must be straight threads so that the ring members 47, 47a and 64 can be caused to compress the end of the plastic liner 11 so as to anchor the plastic liner 11 and to effect a seal to exclude fluids within the lined conduit from entry into the annulus between the conduit and the liner. In the embodiment of the invention shown in FIGURES 1 and 2 the threads can be tapered threads because additional gasket rings can be added if needed. In all cases a rubber or neoprene "recess filler" is placed around the liner at each collar to occupy the space in the collar between the conduit ends. The threads at the center of the collar can be rendered smooth by filling them with a material which will set to a solid, such as epoxy cement.

The following specific embodiments of the invention will be helpful in attaining a better understanding of the invention but should not be construed as unduly limiting the invention.

The terminal seal of FIGURE 1 was used as the bottom end seal in a salt water injection well in a water flood secondary recovery project in Western Kansas. The well depth was about 3400 feet. The plastic liner was a linear copolymer of ethylene and 1-butene (2.5% 1-butene) having a density (ASTM D 1505–57T) of 0.958 gm. per cc. and having an outside diameter of 2.86 inches. The pressure-resistant conduit was 3½ inches outside diameter oil well steel tubing having an inside diameter of about 3 inches so that the plastic liner fits snugly but slidably in the tubing. A stub as indicated at 12 in FIGURE 1 having a shoulder 13 equal to the tubing thickness around its periphery was fused to a section of plastic liner. Neoprene gaskets ¼-inch in thickness were placed on each side of the shoulder. The plastic liner was placed in a section of tubing with the shoulder adjacent the bottom end of the tubing. A perforated, closed-end tailpiece was threaded into a collar and the collar was then threaded onto the end of the tubing so that the shoulder was secured between the tubing end and the tailpiece.

The section of lined tubing was run into the well and another section of liner was fused to the liner end extending above the tubing end. Another section of tubing was lowered over the lining and threaded onto the first section of tubing. These steps of fusing a section of liner to the liner extending above the tubing and then lowering a section of tubing over the standing liner were repeated until the lined tubing was lowered to the desired depth in the well.

At the well head a liner stub shown as 39 in FIGURE 4 was fused to the top of the liner so that the fusion joint was adjacent the collar of the top section of tubing. A bronze sleeve was inserted into the end of the liner so as to rest on the internal flash at the fusion joint. A flange (31 of FIGURE 4) was threaded into the tubing collar; a neoprene gasket was placed over the liner stub against the flange; a flared-end sleeve (36 of FIGURE 4) and a second gasket was placed over the liner stub; and then a second flange was placed over the liner stub and bolted to the first flange. The gaskets sealed the annulus and the sleeve prevented flexure or collapse of the liner stub. Corrosion-resistant fittings were then used to complete the system. These terminal seals have effectively prevented access of fluids to the annulus between the tubing and liner. A packer near the bottom of the string of tubing protects the exterior of the tubing from the salt water. The packer is added between sections of tubing and does not affect installation of the liner because the inside diameter of the packer is the same as that of the tubing. Corrosion-resistant materials can be used below the packer. Corrosion-resistant materials include stainless steel, bronze and other materials not adversely affected by the salt water.

In running a string of plastic-lined tubing the external flash at the fusion joint is removed to facilitate lowering the tubing section over the liner.

Installations of terminal seals in plastic-lined tubing in salt water injection wells have been made in this Western Kansas field, in an Oklahoma field and in a Colorado field using the terminal seals of FIGURES 1, 3 and 4. The seal of FIGURE 4 is used only at the top of the tubing but the seals of FIGURES 1 and 3 have been used at both the top and bottom. All of the seals employed have been successful in preventing access of fluid to the annulus between the tubing and plastic liner.

Some of the installations have been made with 2-inch I.D. tubing in which case the O.D. of the liner was 1.9 inches.

That which is claimed is:

Apparatus comprising first and second metal pipes having threaded terminal ends, a threaded coupling joining said metal pipes, a plastic liner extending through said pipes and having an integral peripheral shoulder disposed within said coupling and between said terminal ends of said first and second pipes, and resilient seal rings between said shoulder and the radial faces of each of said terminal ends to effect a seal between said plastic liner and said metal pipes and to anchor the end of said plastic liner.

References Cited by the Examiner

UNITED STATES PATENTS

| | | | |
|---|---|---|---|
| 1,794,905 | 3/1931 | Kass | 285—370 X |
| 2,794,658 | 4/1957 | Purkhiser | 285—52 |
| 2,982,311 | 5/1961 | Haskell | 285—55 X |
| 2,998,984 | 9/1961 | Gressel | 285—55 |
| 3,120,401 | 2/1964 | Brown | 285—149 |
| 3,160,425 | 12/1964 | Sinnott | 285—55 |
| 3,192,612 | 7/1965 | Elliott | 285—55 |

FOREIGN PATENTS

| | | |
|---|---|---|
| 883,048 | 3/1943 | France. |
| 1,049,173 | 1/1959 | Germany. |
| 1,068,068 | 10/1959 | Germany. |
| 616,115 | 1/1949 | Great Britain. |

CARL W. TOMLIN, *Primary Examiner.*

R. GIANGIORGI, *Assistant Examiner.*